United States Patent
Boucadair et al.

(10) Patent No.: US 10,855,516 B2
(45) Date of Patent: Dec. 1, 2020

(54) SYSTEM FOR RESTORING SERVICES PROVIDED BY A RESIDENTIAL GATEWAY

(71) Applicant: ORANGE, Paris (FR)

(72) Inventors: Mohamed Boucadair, Betton (FR); Christian Jacquenet, Pont-Pean (FR)

(73) Assignee: ORANGE, Paris (FR)

( * ) Notice: Subject to any disclaimer, the term of this patent is extended or adjusted under 35 U.S.C. 154(b) by 18 days.

(21) Appl. No.: 15/765,146

(22) PCT Filed: Sep. 29, 2016

(86) PCT No.: PCT/FR2016/052495
§ 371 (c)(1),
(2) Date: Mar. 30, 2018

(87) PCT Pub. No.: WO2017/055761
PCT Pub. Date: Apr. 6, 2017

(65) Prior Publication Data
US 2019/0058628 A1    Feb. 21, 2019

(30) Foreign Application Priority Data

Sep. 30, 2015  (FR) ..................................... 15 59282

(51) Int. Cl.
*H04L 12/24* (2006.01)
*H04L 12/28* (2006.01)
(Continued)

(52) U.S. Cl.
CPC ...... *H04L 41/0654* (2013.01); *H04L 12/2834* (2013.01); *H04L 12/66* (2013.01);
(Continued)

(58) Field of Classification Search
CPC ..... H04L 12/2834; H04L 12/66; H04L 45/22; H04L 45/28; H04L 41/0654; H04L 69/40; H04W 36/12; H04W 76/19
See application file for complete search history.

(56) References Cited

U.S. PATENT DOCUMENTS

| | | | | |
|---|---|---|---|---|
| 6,542,934 B1 * | 4/2003 | Bader | ................. | G06F 11/2007 |
| | | | | 709/237 |
| 7,283,618 B2 * | 10/2007 | Bergsagel | ............. | H04M 1/738 |
| | | | | 379/27.06 |

(Continued)

FOREIGN PATENT DOCUMENTS

| | | |
|---|---|---|
| FR | 2962869 A1 | 1/2012 |
| WO | 2007106843 A2 | 9/2007 |

(Continued)

OTHER PUBLICATIONS

Murali Kodialam and T. V. Lakshman. "Dynamic Routing of Locally Restorable Bandwidth Guaranteed Tunnels using Aggregated Link Usage Information", Bell Laboratories, IEEE Infocom 2001, 10 pages. (Year: 2001).*

(Continued)

*Primary Examiner* — George C Neurauter, Jr.
(74) *Attorney, Agent, or Firm* — David D. Brush; Westman, Champlin & Koehler, P.A.

(57) ABSTRACT

A residential gateway, which acts, after detecting a fault including at least one service to which the gateway normally gives access not being accessible or the quality of at least one service to which it normally gives access being degraded: to search for at least one IP route, referred to as an "emergency route", to a destination for data associated with the service, and, if the gateway finds such an emergency route, using it to provide the service. The residential gateway is applicable to domestic gateways and to business gateways.

18 Claims, 4 Drawing Sheets

(51) Int. Cl.
*H04L 12/703* (2013.01)
*H04L 12/707* (2013.01)
*H04L 12/66* (2006.01)
*H04L 29/14* (2006.01)

(52) U.S. Cl.
CPC .............. *H04L 45/22* (2013.01); *H04L 45/28* (2013.01); *H04L 69/40* (2013.01)

(56) References Cited

U.S. PATENT DOCUMENTS

| | | | | |
|---|---|---|---|---|
| 7,380,154 | B2* | 5/2008 | Gale | H04L 45/02 370/226 |
| 7,877,785 | B2* | 1/2011 | Selignan | H04W 4/90 726/3 |
| 8,111,631 | B2* | 2/2012 | Acke | H04M 11/062 370/254 |
| 8,477,600 | B2* | 7/2013 | Yong | H04L 45/00 370/217 |
| 8,811,148 | B2* | 8/2014 | Yang | H04L 41/5067 370/216 |
| 8,886,831 | B2* | 11/2014 | Tirumalai | H04L 45/22 370/218 |
| 9,577,873 | B2* | 2/2017 | Kayser | H04L 41/0668 |
| 9,730,051 | B2* | 8/2017 | Manik | H04W 8/183 |
| 9,917,724 | B2* | 3/2018 | Niu | H04L 41/0893 |
| 10,187,300 | B2* | 1/2019 | Fedor | H04L 45/28 |
| 2005/0185626 | A1* | 8/2005 | Meier | H04L 12/4641 370/338 |
| 2008/0101448 | A1* | 5/2008 | Meleis | H04M 3/306 375/225 |
| 2011/0066875 | A1 | 3/2011 | Fan et al. | |
| 2011/0103392 | A1* | 5/2011 | Fan | H04L 41/0668 370/401 |
| 2011/0216646 | A1* | 9/2011 | Flinta | H04L 12/5692 370/220 |
| 2014/0075011 | A1* | 3/2014 | Salkintzis | H04L 12/2856 709/224 |
| 2014/0325090 | A1* | 10/2014 | Michelin | H04L 61/103 709/245 |
| 2015/0124585 | A1* | 5/2015 | Sahin | H04W 36/12 370/218 |
| 2016/0278158 | A1* | 9/2016 | Van Oost | H04W 12/04 |
| 2017/0230280 | A1* | 8/2017 | Prunet | H04L 12/2825 |
| 2018/0027433 | A1* | 1/2018 | Elliott | H04W 24/04 370/216 |
| 2018/0316603 | A1* | 11/2018 | Boucadair | H04L 12/2834 |

FOREIGN PATENT DOCUMENTS

| | | |
|---|---|---|
| WO | 2010044714 A1 | 4/2010 |
| WO | 2012004503 A1 | 1/2012 |

OTHER PUBLICATIONS

P. Pan et al. "Request for Comments (RFC) 4090: Fast Reroute Extensions to RSVP-TE for LSP Tunnels", May 2005, 38 pages. (Year: 2005).*

H. Holbrook et al. "Request for Comments (RFC) 4604: Using Internet Group Management Protocol Version 3 (IGMPv3) and Multicast Listener Discovery Protocol Version 2 (MLDv2) for Source-Specific Multicast", Aug. 2006, 11 pages. (Year: 2006).*

R. K. Sinha et al. "Proactive Network Management of IPTV Networks", AT&T Labs—Research, New Jersey, USA, INM/WREN'10 Proceedings of the 2010 internet network management conference on Research on enterprise networking, 6 pages. (Year: 2010).*

International Search Report dated Nov. 30, 2016 for corresponding International Application No. PCT/FR2016/052495, filed Sep. 29, 2016.

English translation of the Written Opinion of the International Searching Authority dated Nov. 30, 2016 for corresponding International Application No. PCT/FR2016/052495, filed Sep. 29, 2016.

* cited by examiner

SYSTEM FOR RESTORING SERVICES PROVIDED BY A RESIDENTIAL GATEWAY

CROSS-REFERENCE TO RELATED APPLICATIONS

This Application is a Section 371 National Stage Application of International Application No. PCT/FR2016/052495, filed Sep. 29, 2016, the content of which is incorporated herein by reference in its entirety, and published as WO 2017/055761 on Apr. 6, 2017, not in English.

FIELD OF THE DISCLOSURE

The present invention relates to residential gateways. More particularly, the invention relates to restoring at least one telecommunications service to which a residential gateway gives access so as to ensure continuity of service in the event of a fault. For reasons of concision, it is said below that a gateway is "faulty" when at least one service to which it gives access under normal circumstances is no longer accessible, or when the quality of at least one service to which it gives access under normal circumstances is degraded.

BACKGROUND OF THE DISCLOSURE

The Internet protocol (IP) network is nowadays the universal medium for a multitude of applications and services such as voice-over-IP (VoIP), or digital television (IPTV). It is the federating network that has been adopted by telecommunications operators for implementing various offers of service. For several years, this democratization of the Internet has made the general public one of the preferred targets of telecommunications operators who are ever more numerous in seeking to position themselves in this market segment. This movement has been accompanied by the development of offers of services that are specifically adapted to this customer base, combining several services, thus making use of the advantages of the IP network. These include so-called "multi-service" offers such as "triple play" offers that give access simultaneously to the Internet, to video contents (including broadcast television programs), and to conversational services (telephony over IP), which have captured an increasing share of the market. These offers are usually presented in the form of package deals, and they attract the general public because of rich functionality that is accessible at a reasonable price. Under such circumstances, telecommunications operators are seeking to distinguish themselves from one another by increasing and diversifying the number of services that are available in their "packages", in order to attract and then retain their customers, in particular general public customers. In this respect, all general public customer profiles constitute potential marketing targets, from young couples to retirees.

One of the factors common to the offers of all of those operators is the installation of a residential gateway, which is also often referred to as a "set top box", or customer premises equipment (CPE), or a home gateway (HG), and which is referred to simply as "gateway" below. Such equipment, installed on the premises of a customer (which may in particular be a home or a business) of a telecommunications operator or of a services provider, is an element that concentrates all of the connections that give access to the services to which the customer has subscribed and to the applications used by the customer. Specifically, as its name indicates, it constitutes a genuine gateway between firstly the services provider or operator and secondly customers:

- in terms of connectivity—a residential gateway is connected to the operator's network on one side, and on a customer side it provides a set of various interfaces, e.g. a wireless interface such as a wireless local area network (WLAN), or a Bluetooth network, an RJ11 socket for a telephone, RJ45 socket for digital TV and computers, or universal serial bus (USB) sockets;
- in terms of services—it manages all of the services to which the customer has subscribed, and the functions that give access to those services: telephony, television, Internet connection, satellite equipment, network address translator (NAT) functions, firewall functions, etc.; and
- in terms of applications—by way of example, it includes software specific to the operator for supplying services to the operator's customers, for diagnostic purposes, or for automatically managing software updates.

For reasons of concision, it is said below that a gateway "provides" a telecommunications service to the user of the gateway, even though, in fact, the gateway merely enables the user to access the service.

In spite of their ever wider presence within the homes of the general public, for most users such residential gateways remain pieces of equipment that are poorly known or indeed "mysterious". Worse, once the gateway has been installed on subscribing to the service (assuming that customers perform their own installation), most users no longer takes action on the equipment. As a result, such gateways generally constitute "black boxes" that are poorly known to their users, even though they constitute the central node that gives access to all of the services that users make use of daily.

This poor knowledge even leads to this equipment being held in contempt, often being considered as constituting a pointless extra expense (since the gateway is usually leased to the customer), or as equipment that needs to be restarted electrically if there is a problem affecting any of the services.

Most residential gateways have a web interface for configuration and management purposes that is accessible in protected manner via the hypertext transfer protocol (HTTP). This interface is accessible via a uniform resource locator (URL) that may be in the form of a predefined address (e.g. the IPv4 address "192.168.1.1", or a specific service name such as "MyBox"); an identifier and a password are generally required to access it in administrative mode. Once authenticated, the customer (user) can then access various tools making it is possible to act directly on the services and connections managed by the residential gateway. Most customers have little knowledge about this administrative interface of the gateway. Furthermore, in order to be able to take advantage of it, a customer must generally be familiar with technical terms used for describing such services, otherwise the customer will not be able to predict exactly the impact of any modifications made using the administrative interface.

In other words, accessing the management elements (even at a basic level) of a residential gateway requires some minimum level of knowledge on the part of general public customers, thereby necessarily reducing the number of customers who are capable of making use of these facilities. Something that may appear from the operator's point of view as a guarantee of security (since the risk of people with little knowledge compromising the system is reduced), simultaneously serves to prevent such people from having means to control simple functions of the residential gateway.

This ignorance is particularly harmful when better knowledge about the residential gateway would certainly give customers better control over the operation of the services to which they have subscribed, thereby minimizing any need to call a technical assistance hotline in the event of an observed malfunction (e.g. when the user of a residential gateway can no longer access any one of the telecommunications services that would normally be accessible via the gateway, or when the level of quality of any one of the services normally accessible via the residential gateway is degraded compared with its nominal level). Specifically, most basic function, and even advanced functions, can be managed directly using the residential gateway. Unfortunately, most general public customers do not have sufficient knowledge to be able to manage those functions directly, which leads to an increase in calls to the technical assistance hotline in the event of a malfunction being observed, even though some such malfunctions can easily be solved by acting directly on the home gateway. Given the cost to service providers and operators of managing technical assistance services, and ignoring any impact on their image (waiting time, call costs), it is important to put solutions into place that are effective in reducing the number of calls to the technical assistance services of service providers and operators.

The systems presently available to general public customers for restoring service present in particular the following limitations:

managing faults requires the customer to call the service provider or operator in order to indicate that a service is unavailable or degraded; furthermore, if the gateway has become incapable of connecting to the network and if the customer's telephone line is connected to the gateway (as applies with VoIP), the telephone line is unavailable, so the customer cannot use it for calling the technical assistance service;

customers do not know whether the operator has taken action in order to resolve faults that are affecting a service to which they are entitled;

the time expected to resolve faults is not known in advance; and the service is unavailable during the time taken by the services provider or the operator to resolve a fault; in this respect, it should be observed that certain operators presently make use of a procedure for lending equipment (e.g. a 3G key) in order to enable certain customers to continue to access the Internet; this commercial approach has several drawbacks, e.g. the customer must go to a shop, or the customer does not necessarily have access to all of the services that have been subscribed to: specifically the customer then has access only to services that can be obtained directly from access to the Internet; in particular, access to the digital TV service (IPTV) is not guaranteed.

SUMMARY

The present invention thus provides a residential gateway including means for acting, after detecting a fault consisting in at least one service to which said gateway normally gives access not being accessible or in the quality of at least one service to which it normally gives access being degraded:

to search for at least one IP route, referred to as an "emergency route", to a destination for data associated with said service, said emergency route passing:
via an IP interface of said residential gateway, referred to as an "emergency interface", other than the connection between the residential gateway and its nominal network connection equipment; and
via another communicating device, referred to as a "broadcasting device", with which the residential gateway is suitable for setting up a network association; and to select such an emergency route in order to supply said service by using said broadcasting device as a relay.

Said residential gateway is remarkable in that it further comprises means for detecting the presence of said broadcasting device by listening for and recognizing at least one identifier, referred to as an "emergency identifier", broadcast by said broadcasting device.

By means of these provisions, by calling on communicating devices situated in its neighborhood, the residential gateway can continue to render the service(s) to which the customer is entitled when events of various kinds have the effect of degrading the quality level associated with a service to which the residential gateway gives access. The invention thus guarantees continuity for one or more services in the event of faults located in gateways (including when the fault affects a main member of the gateway) or in their neighborhood (in particular the local domestic network), or indeed in the event of faults occurring in the operator's network, by enabling the faulty gateway to search for emergency palliatives, and to do so in independent manner. It should be observed that the service restoration systems currently available to general public customers do not include technical means for guaranteeing continuity of service in independent manner.

Furthermore, the invention advantageously proposes means for restoring service that do not involve any intervention on the part of the customer. Optionally, it is naturally possible to keep the customer informed about progress in handling the fault, while also ensuring that the procedures for detecting and resolving faults remain transparent for the customer (specifically, the invention can be performed without informing the customer that a fault has been detected, particularly when an emergency route has been found that makes it possible to continue providing the service concerned by the fault). In any event, the invention significantly improves customer experience and satisfaction.

According to particular characteristics, said residential gateway includes means for acting, after selecting said at least one emergency route, to update a routing table including said emergency route.

By means of these provisions, the residential gateway can dynamically implement routing and relaying policies for directing outgoing traffic to one or more emergency routes.

According to even more particular characteristics, said routing table includes said emergency route prior to said detection of a fault.

By means of these provisions, after detecting a fault, the residential gateway can determine immediately which emergency routes are available.

According to other particular characteristics, said gateway further comprises means for:

detecting said fault;
searching for at least one route capable of connecting it to at least one Gateway Supervision Center; and
if it finds such a route and if it detects a fault, using said route to send at least one fault report to at least one Gateway Supervision Center.

Thus, the present invention proposes providing a residential gateway with technical means that enable it to detect faults and to inform the network operator or the service provider about these faults, and to do so in a manner that is independent and proactive, i.e. specifically without involving the customer. Residential gateways are thus integrated in the supervision system of the network operator or the service provider. It should be observed that the service restoration systems currently available to general public customers include, in certain embodiments (cf. for example application EP-2 247 088) automatic means:

for detecting a fault in a residential gateway; and for notifying the fault to the user of the gateway, but do not include means for automatically notifying the network.

For this purpose, the gateway can send a fault report, e.g.:

via an IP interface; or by using layer 2 (L2) transport techniques (where "layer 2" of the OSI model, also known as the "data link layer" does not involve using IP transfer functions such as IP routing and relaying) if the L2 layer of connection to the access network is still operational (i.e. if the segment between the gateway and a connection equipment situated in the operator network is still operational).

By means of these provisions, the time required for re-establishing services affected by the fault is reduced and the number of calls to the technical assistance services is also reduced (which calls are expensive for operators).

It should be observed that implementing the invention does not require a telephone terminal, nor does it require a special interface on the gateway. Nevertheless, it is optionally possible to integrate external terminals for needs such as notifying faults, or transmitting specific messages to the operator network.

In a second aspect, the invention also provides a service restoration system comprising:

at least one residential gateway as briefly described above; and at least one other communicating device, referred to as a "broadcasting device", having means for acting as a relay for said residential gateway in order to provide said service, and also means for broadcasting an identifier recognizable by the residential gateway.

The advantages offered by this system are essentially the same as those offered by the gateway briefly described above.

According to particular characteristics, said emergency identifier is characteristic of the technology of said emergency interface and/or of said service.

By means of these provisions, if the gateway has a plurality of emergency interfaces, it can use different interfaces and thus different emergency routes depending on the technology of the emergency interface used and/or depending on the service for which continuity needs to be provided.

According to other particular characteristics, said broadcasting device further comprises means for temporarily ceasing to broadcast said emergency identifier when it does not have a functional IP route for providing the service(s) associated with said emergency identifier.

By means of these provisions, routing loops are not generated as a result of a faulty residential gateway selecting for the purpose of relaying traffic a broadcasting device that is at that time incapable of acting as a relay (e.g. because the fault is affecting a network element that terminates the connections to the network both of the gateway and of the broadcasting device).

In a third aspect, the invention provides a method of restoring service, the method comprising the following steps:

detecting a fault consisting in at least one service to which a residential gateway normally gives access no longer being accessible or in the quality of at least one service to which a residential gateway normally gives access being degraded;

said gateway searching for at least one IP route, referred to as an "emergency route", to a destination for data associated with said service, said emergency route passing:

via an IP interface of said gateway, referred to as an "emergency interface", other than the link between the gateway and its nominal network connection equipment; and via another communicating device, referred to as a "broadcasting device", with which the residential gateway is suitable for setting up a network connection; and the residential gateway selecting such an emergency route to provide said service by using said broadcasting device as a relay.

Said method is remarkable in that the residential gateway detects the presence of said broadcasting device by listening for and recognizing at least one identifier, referred to as an "emergency identifier", broadcast by said broadcasting device.

According to particular characteristics, following said selection of at least one emergency route, said method comprises a step of updating a routing table including said emergency route.

According to even more particular characteristics, said routing table includes said emergency route prior to detecting a fault.

According to other particular characteristics, said emergency identifier is characteristic of the technology of said emergency interface and/or of said service.

According to yet other particular characteristics, said fault detection is performed by said gateway, and the gateway then performs the following steps:

searching for at least one route capable of connecting it to at least one Gateway Supervision Center; and if it finds such a route, using said route to send at least one fault report to at least one Gateway Supervision Center.

According to even more particular characteristics, said residential gateway sends said fault report via an IP interface or via the data link layer.

The advantages offered by this method are essentially the same as those offered by the system briefly described above.

It should be observed that it is possible to implement the gateway and the broadcasting device of the invention in the context of software instructions and/or in the context of electronic circuits.

That is why the invention also provides a computer program downloadable from a communications network and/or stored on a computer readable medium and/or executable by a microprocessor. The computer program is remarkable in that it includes instructions for executing steps of the service restoration method set out briefly above, when executed on a computer.

The advantages offered by this computer program are essentially the same as those offered by the method set out briefly above.

Other aspects and advantages of the invention appear on reading the following detailed description of particular embodiments, given as non-limiting examples.

BRIEF DESCRIPTION OF THE DRAWINGS

The description refers to the accompanying drawings, in which.

DETAILED DESCRIPTION OF ILLUSTRATIVE EMBODIMENTS

Figure 1:
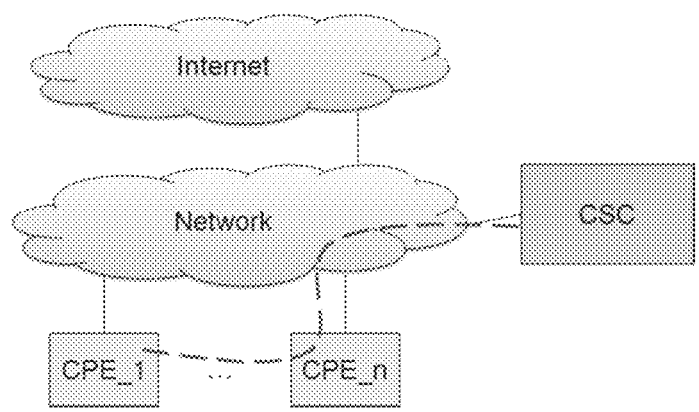
FIG. 1 shows a gateway sending a fault report to a service contact point.

As explained above, the invention seeks to enrich the capabilities and the intelligence of a residential gateway in order to ensure continuity of service in the event of a fault. The gateways must naturally be configured to implement the invention; this configuration may be performed statically or dynamically, e.g. using protocols such as dynamic host configuration protocol (DHCP) or customer-premises equipment (CPE) WAN management protocol as specified in technical report 69 (TR-69).

In order to resolve certain fault situations in which customers make pointless calls to the technical assistance service, and providing that a customer still has access that is operational, it is possible to make use of a network interface that does not form part of the interfaces specified in the commercial offer to which the customer has subscribed. To illustrate this situation, consider a gateway that is fitted both with an optical fiber interface and with an electrical interface of the asymmetrical digital subscriber line (ADSL) type. If a customer connects the gateway using the optical port instead of connecting it to the ADSL port (because the customer has not paid attention to the "color code" specified in the installation instructions, or because someone has modified the connection), the customer can no longer access the subscribed services; in other words, this ADSL customer cannot access the connectivity service if the connection is made via the optical port. Under such circumstances, provision could be made for a message to be displayed immediately to the customer via a dedicated interface for indicating that even though the connected network port is active (flashing light-emitting diode (LED) to indicate that the line is functional from the physical connection point of view), connectivity cannot be supplied since the service subscription is not compatible (access to service refused), and the gateway can immediately propose an invitation to make use of the "proper" network port.

Issuing such a message assumes that the gateway has available the necessary information concerning the commercial package to which the customer has subscribed. It should be observed that all this information about the incompatibility between a commercial packet and the physical connection selected for the gateway can be detected (or collected) by the network, so that the network can be ready to handle a call made by a customer who has not understood the proposed local solution.

By way of example, there follows a description of an implementation of the method of the invention for restoring service.

In a first step, a network entity detects a fault concerning a residential gateway CPE_1 connected to the network. It should be observed that a plurality of services may be faulty simultaneously. In particular, a fault in one service may have the consequence of making all of the services that rely on the faulty service unavailable: for example, the unavailability of the service giving access to the Internet can prevent electronic messages being communicated and can prevent telephone calls being set up. This intrinsic dependency between services (and other logical connections between services) can be known to or detected by the residential gateway.

In a first variant, it is the gateway CPE_1 itself that detects the fault. For this purpose, the gateway CPE_1 preferably includes the following two modules.

A first module records recent modifications in the configurations and the states of physical interfaces, and also the decisions taken locally by the gateway in automatic manner. These decisions taken locally are for resolving certain problems without calling on the network. The first module also records software updates and operations of activating/deactivating services such as domain name system (DNS), universal plug-and-play (UPnP), firewall, port control protocol (PCP), or server message block (SMB) available as "SAMBA".

These records are time-stamped. The gateway preferably activates a mechanism for synchronizing its internal clock, e.g. by making use of the resources of the network time protocol (NTP). A file for containing diagnosis and fault-finding operations is held by the gateway. This file can be consulted remotely by the operator or can be recovered by a fault management platform. It may be associated with any complaint issued by the customer. It should be observed that the data contained in this file must not invade privacy or disclose personal information. Only information necessary for providing the service(s) is handled. This mode continues to operate even during the fault.

A second module acts to verify whether the services to which the customer has subscribed are fully accessible (i.e. accessible with the nominal quality of service (QoS)). This module also verifies local services in the gateway, such as for example a print server or a file sharing server. The reference used for determining a nominal level for providing a service may be calculated locally by the gateway on the basis of heuristics (e.g. local profiling), or may be provided by the operator as input data to a dedicated application. This information is specific to each service, to the underlying technology used for providing a service, and also includes other parameters.

This second module is also responsible for detecting any loss of connectivity in the local network (e.g. a problem of connecting a laptop computer) or in the wide area network (WAN). This module serves to distinguish between faults that come from the local network and that come from the WAN. In particular, the status of WAN connectivity needs to be monitored and verified regularly. This module performs local tests, e.g. regularly, or when certain events occur. The results of these tests are stored locally so as to make it possible to evaluate any deviance in the behavior of the gateway. The results are also time-stamped so as to facilitate configuration operations performed by the customer or requested by the operator, and the observed fault.

The gateway also has means for purging the data used for independent service supervision. These means may be automatic (e.g. changing the customer's connection identifier, critical memory size exceeding a certain threshold, memory leakage, etc.) or they may be invoked on request (either by the network operator or by the customer). Thus, in the context of independent management of the gateway, certain adjustments may be carried out locally, such as deactivating a faulty process. Nevertheless, precautions may be taken to minimize any risk of malfunction of independent management procedures, e.g. by giving them high priority. Other precautions may be taken to ensure the reliability of the independent control system. These precautions are generally specific to each operator.

In a second variant of said first step, the fault affecting the gateway CPE_1 is detected by an entity other than the gateway CPE_1 itself, which entity may be situated in the network access infrastructure. For example, a fault caused by a break in the connection connecting the gateway to the network may be detected by a digital subscriber line access multiplexer (DSLAM) or by a broadband remote access server (BRAS). Furthermore, this detection may be performed by a dynamic routing protocol, or by a fault detection protocol such as the bidirectional forwarding detection (BFD) protocol.

In a second step of the present implementation, the network entity that has detected the fault sends at least one fault report to at least one CPE supervision center (CSC) situated upstream in the network to which the gateway is connected, so as to inform the network of the fault, and launch the operations needed for determining the origin of the fault and for repairing it.

It may be observed that:
- a plurality of CSCs may be deployed in a service provider or operator network; under such circumstances, one, some, or all of the CSCs may receive one or more fault reports; and
- even if the sending entity knows of only one CSC, it may send it the fault report several times over (e.g. three times) in order to be sure that the report is indeed received.

Optionally, on receiving the fault report, a CSC may issue a fault ticket; furthermore, a fault number is communicated to the gateway. This number may also be communicated to the customer locally (e.g. on a configuration interface of the gateway or on a TV), or by short message service (SMS) or by simple mail transfer protocol (SMTP). A message may be displayed using a screen of the gateway, the message informing the customer that action is being taken, and inviting the customer not to call the technical assistance service. The customer is preferably regularly informed about progress in handling the fault. A fault report may be made available to the customer once the fault has been solved. This report may be sent to the customer (email, SMS), or it may be consultable on line. When performance of the invention provides a level of service similar to the nominal level, the procedure may omit the notification stage: there is no need to pollute the customer with information that is not pertinent, given that the service being provided retains its quality level; this is to make detection and correction of faults as transparent as possible for the customer.

In the context of the first above-described variant, the gateway also has means for searching for at least one route capable of connecting it to at least one CSC either after or, preferably before, detecting a fault.

If the fault affects the IP layer of the connection between the gateway and its network connection equipment, the gateway can nevertheless send a fault report by using level 2 (L2) framing (e.g. by sending Ethernet packets), unless the L2 layer is also faulty. If the gateway no longer has any IP connectivity, it is necessary to wait for the service provider or operator technical services to resolve the fault; under such circumstances, it is preferable to inform the customer that the network has been notified of the fault (e.g. using one of the above-described techniques).

In contrast, if the gateway has at least one IP interface (referred to below as the "emergency interface") other than the connection between the gateway and its nominal network connection equipment, then the gateway can optionally send the fault report via this emergency interface, instead of using L2 framing.

By way of example, FIG. 1 shows a fault report sent from a gateway CPE_1 that has detected a fault being conveyed via one or more gateways CPE_2, CPE_3, . . . , CPE_n acting as relays.

Figure 2:
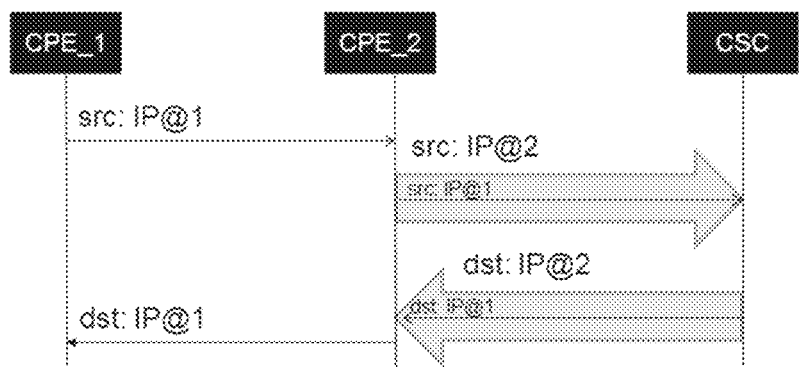
FIG. 2 shows an example of messages exchanged via a single relay gateway between a gateway that has detected a fault and a service contact point.
Figure 3:
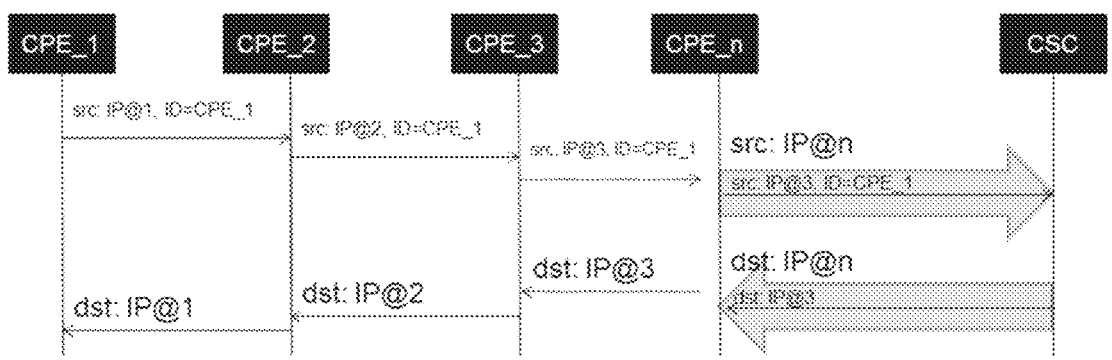
FIG. 3 shows an example of messages exchanged via a plurality of relay gateways between a gateway that has detected a fault and a service contact point.

FIG. 2 shows an example of messages exchanged between a gateway CPE_1 that has detected a fault and a CSC via a single relay gateway CPE_2. FIG. 3 shows an example of messages exchanged between a gateway CPE_1 that has detected a fault and a CSC via a plurality of relay gateways CPE_2, CPE_3, . . . , CPE_n. In addition to the source IP address used in said messages, the routing tables of the relay gateways may take account of an identifier that is specific to each gateway, such as a serial number or a medium access control (MAC) address.

In response to receiving and analyzing a fault report, a CSC can send instructions to the faulty gateway. In particular, the CSC or the network can send the gateway an instruction to leave it to the network to take charge of the operations for providing continuity of service. If a CSC has received the fault report over a plurality of paths, it may choose which of those path(s) to use for transmitting its instructions to the gateway.

In a third step of the present implementation, the faulty gateway provides continuity of service independently. Naturally, it is assumed at this point that the gateway has not received a counter-order from the network, as in the above-mentioned option; furthermore, it is assumed that the faulty gateway has at least one emergency interface, as defined above.

In order to be able to provide continuity of service in independent manner, the faulty gateway must be capable:
- of behaving as a customer terminal, i.e. it must be capable of setting up a network association with some other device, that is referred to below as the "emergency device"; and
- of finding an IP route passing via one of its emergency interfaces and via an emergency device that leads to a destination concerned by a service that is to be restored.

In the context of the present invention, the term "IP route" is used to mean a route that is calculated, selected, and installed by a faulty gateway in order to convey IP traffic to a given destination.

In this respect, it should be observed that:
- an IP route used by the gateway to send a fault report to a CSC is not necessarily an emergency route used for restoring a service; and
- if the gateway has a plurality of emergency interfaces, it may use different interfaces for restoring different services; in other words, the emergency route that contributes to guaranteeing continuity of service may be specific to each service; the gateway should thus preferably be capable of maintaining routing tables on a per-service basis, and of implementing mechanisms for associating a route with a service, i.e. for dynamically implementing routing and forwarding policies in order to direct outgoing traffic over one or more emergency routes.

It should also be observed that the invention makes no assumption concerning the nature of the emergency devices. In particular:

the emergency devices may for example be gateways, mobile terminals, or WLAN access points;

the emergency devices may be operated by the same operator, or by operators different from the operator who operates the main line of the faulty gateway; and the emergency devices may make use of different kinds of connectivity technology (such as WiFi, WiMAX, GSM, LTE, 5G, Ethernet, or fiber); for example, in order to restore a digital television service, it is preferable to use as the emergency device another residential gateway (as contrasted for example to a mobile telephone), since digital television signals are generally broadcast in multicast transmission mode to residential gateways.

When a gateway suffers a fault affecting its nominal IP connectivity service, it automatically sets up a session association with an emergency device situated nearby. This emergency device is to act as a relay. The IP routing table of the gateway is then updated accordingly. For this purpose, and optionally, it is possible to set up in the gateway, even before any fault has been detected, an emergency routing table on a per-service basis, so that the gateway can have that table available immediately on detecting a fault; under such circumstances, the structure of the routing tables may be configured to indicate the type of a route, i.e. "main" or "emergency".

Interconnection agreements (for this new form of "roaming" referred to below as "CPE roaming") may be required to enable emergency devices to be used (without customers necessarily being aware of these agreements); CPE roaming agreements enable an operator to provide optimum coverage in order to help out certain gateways of its customers in the event of faults; in this way, sharing the emergency procedure between all operators or between a group of operators serves to optimize the costs of integration and also to improve the effectiveness of the procedure.

Figure 4:
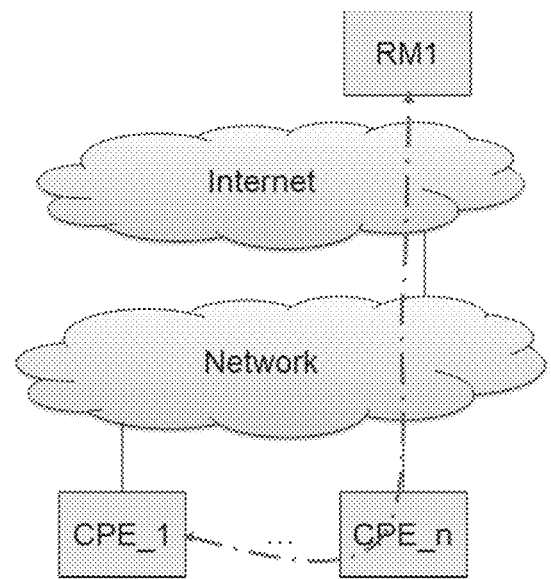
FIG. 4 shows the path taken by data sent by a gateway that is faulty to a correspondent connected to the Internet.

By way of example, in FIG. 4, data sent by a faulty gateway CPE_1 is conveyed via a correspondent remote machine RM1 that is connected to the Internet, via a succession of emergency devices that are constituted in this example by gateways CPE_2, CPE_3, . . . , CPE_n.

The traffic sent via an emergency route may be rejected by the operator network on failure of identification of the gateway or if the customer has not subscribed to the service associated with that traffic. Specifically, it is necessary to prevent a user being able to use the resources of the continuity of service system of the invention in order to access a service to which that user is not entitled and therefore cannot access via the main connection.

In order to avoid an ill-intentioned user intercepting the traffic of other customers and simulating an emergency device, provision is preferably made for a mutual authentication procedure between the gateway and the emergency device that is selected for relaying the fault report and/or for providing continuity of service (this relay device is referred to as the "called-on" relay device); this mutual authentication serves to avoid the faulty gateway relaying traffic to a "pirate" device, i.e. a device that is not authorized to relay data sent by the gateway and that is potentially suitable for giving rise to a denial of service. Furthermore, in order to preserve confidentiality for the exchanges, all traffic sent to a called-on relay device is preferably encrypted.

During the attachment stage, either by way of prevention or in the event of detecting an address conflict, the called-on relay device allocates an IPv4 address or an IPv6 address, or both, to the faulty gateway, a pool of IPv4 and/or IPv6 addresses being reserved for this purpose.

The identifier (such as a serial number or a MAC address) of the faulty gateway is not changed while conveying its packets to the called-on relay device. Each intermediate gateway keeps in memory a status of a packet that has been relayed to other neighboring gateways or the CSC. This storage may be used for sending the fault report to the CSC and for receiving instructions from the network (FIG. 1), and/or for guaranteeing service continuity in the event of a fault (FIG. 4) by setting up symmetrical routes that enable the return traffic to the faulty gateway to be relayed. The above-described example messages shown in FIGS. 2 and 3 give more detail concerning how packets are handled by the intermediate gateways; in particular, with reference to those two examples, a NAT operation is performed by each intermediate relay gateway without modifying the identifier of the faulty gateway.

Figure 5:
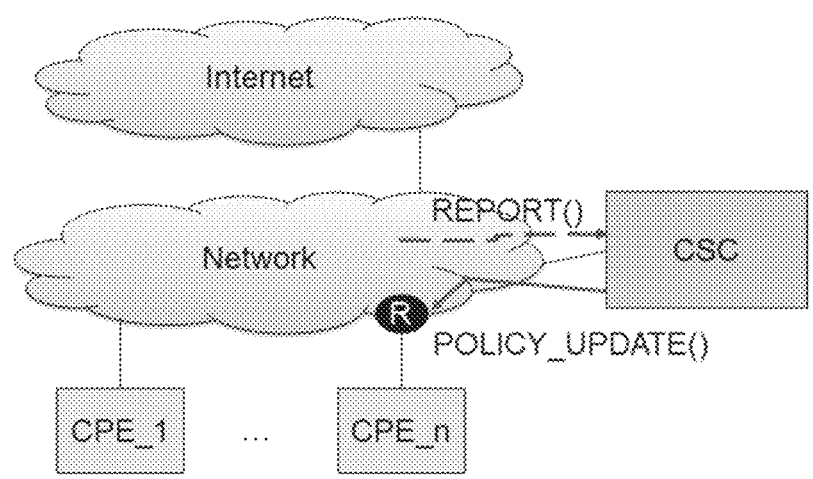
FIG. 5 shows a Gateway Supervision Center sending a message containing instructions that are to be applied by the network after it has received a fault report.

In order to avoid disturbing the operation of emergency devices acting as relays for a faulty gateway, provision may be made to activate traffic policing/shaping rules automatically; these rules are deactivated once the nominal service has become operational once more. For the same purpose, and as shown in FIG. 5, the CSC can update the policing/shaping traffic rules as applied, preferably, by the node R giving access to the network (which node may be a DSLAM, for example) in the string of emergency devices in order to be able to absorb the traffic of the faulty gateway. By way of example, after receiving the fault report REPORT( ), the CSC may send a POLICY_UPDATE( ) message having the effect of modifying the policing/shaping rules, the uplink/downlink resources threshold, the services that are authorized, and so on.

Figure 6:
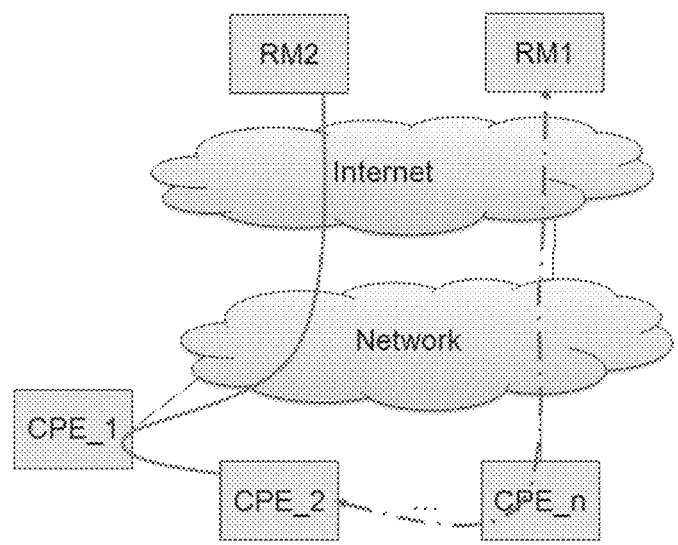
FIG. 6 shows a gateway that is faulty using a plurality of relay devices either together or else in turn.

In order to avoid degrading the level of service of an emergency device acting on its own as the relay for a faulty gateway, the gateway may call on a plurality of emergency devices. For example, the faulty gateway may make use of a plurality of relay gateways, while correspondingly sharing traffic between them, or it may make use of each relay gateway in turn for some given length of time. A plurality of emergency devices may thus be called on for a given service or for different services. By way of example, FIG. 6 shows a faulty gateway CPE_2 that uses as emergency devices:

a gateway CPE_1 for communicating with a correspondent remote machine RM2; and a string of gateways CPE_3, . . . , CPE_n for communicating with a correspondent remote machine RM1.

Figure 7:
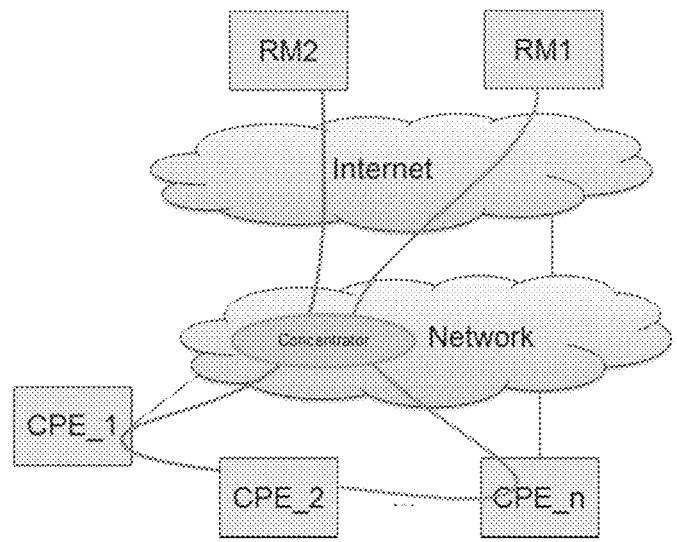
FIG. 7 shows a configuration analogous to that of FIG. 6, but in which use is also made of a network connection concentrator.

In order to ensure that the data sent by a faulty gateway reaches its correspondents in packets that present same source address (referred to as the "external address") independently of the relay device(s) that have been called on, it is possible, as shown in FIG. 7, to use a (conventional) network connection concentrator; in this respect, it should be recalled that a "network connection concentrator" designates any network function for aggregating connections making use of different paths that may be available to any device for setting up communication with any remote device. In addition, it is thus possible to isolate traffic from the faulty gateway and from traffic from the relay device, and to provide legal interception functions. In this implementation, the traffic is encapsulated going to said concentrator; the identifier of the faulty gateway is inserted in the header of the packet encapsulating the data sent by that gateway.

Figure 8:
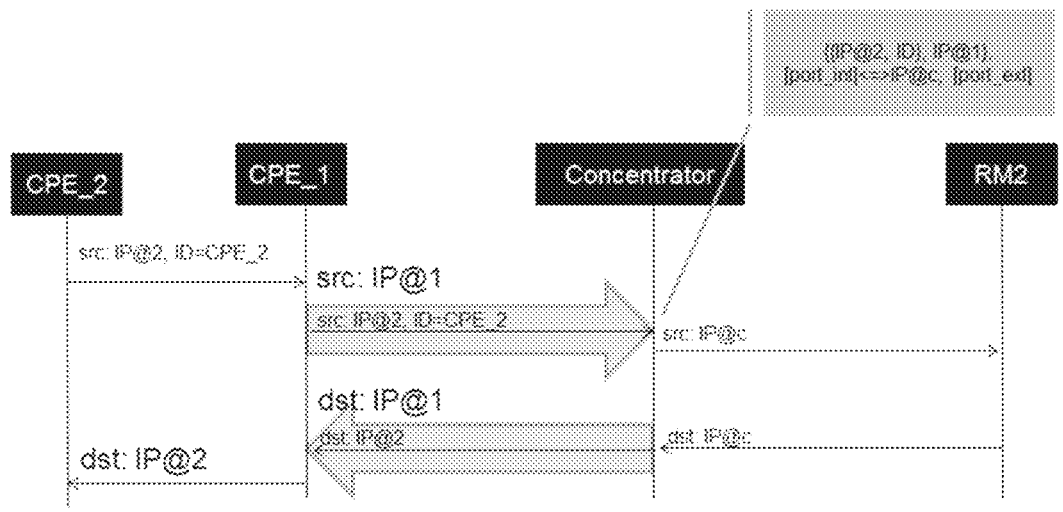
FIG. 8 shows an example of messages exchanged between a gateway that is faulty and a correspondent via a string of gateways and a concentrator.

FIG. 8 shows an example of messages exchanged between a faulty gateway and a correspondent remote machine RM1 via a string of gateways CPE_3, . . . , CPE_n, and a concentrator.

In order to compensate the contribution of an emergency device operating in emergency mode (e.g. in order to compensate for the use that is made of that device by a third party user, including the electricity consumption due to non-personal usage), the operator may provide for a commercial gesture in favor of the proprietor of the emergency device. Furthermore, users generally rely on the LEDs of gateways in order to detect that traffic is being sent and/or received by a gateway. That is why it is possible to use a dedicated LED to reassure the proprietor of a gateway that has been used as a relay that the traffic being exchanged is legitimate. In a variant, LEDs may indicate the presence or the absence of relayed traffic: for example, the "green" color code could be used to indicate that the gateway is handling only local traffic from the customer, while the "orange" color code could be used to indicate that, in addition to local traffic from the customer, the gateway is handling traffic from another customer in the context of the emergency procedure. The meters monitoring the interfaces also need to take account of this distinction between local traffic and relayed traffic that is characteristic of some other user/customer.

The use of IP connectivity in spite of the fault affecting the nominal IP connectivity service can occur in a wide variety of ways in practice.

Thus, in the prior art, service restoration systems are known in which the gateway has available, nearby, at least one emergency WAN route that is permanent, e.g. because the gateway is connected to a long-term evolution (LTE) radio station, or because the gateway is installed on the premises of a business that always makes provision for two connections to the network(s) relying on the use of two distinct paths. Those known systems have the drawback of requiring the permanent presence (and maintenance) of emergency equipment of considerable size, whereas faults occur only rarely (in principle).

The present invention resolves this problem by proposing that, on detecting a fault, the gateway dynamically selects another IP route, other than the nominal route for connection to the network, this other IP route (referred to as the "emergency route") passing via an emergency device suitable for acting as a relay; by way of example, the gateway may make use of a customer's mobile telephone, connected to a WLAN interface, or Bluetooth, or near field communication (NFC) of the gateway and that serves to relay data traffic to a global system for mobile communications (GMS) or an LTE connection. Furthermore, the emergency IP route(s) may be installed in routing tables in proactive manner so as to anticipate any service degradation or fault.

In order to enable a gateway thus to call dynamically on one or more relays in the event of a fault, the invention proposes using one or more dedicated identifiers that are referred to as "emergency identifiers" and that are detected ("listened-for") by the gateway before and/or after detecting the fault. The emergency identifiers are configured in a particular set of emergency devices referred to as "broadcasting devices" that may, by way of example, be residential gateways and/or WLAN access points and/or customer mobile terminals; each emergency identifier is broadcast, preferably periodically, by at least one broadcasting device. A given emergency identifier may be specific to each network operator, or may be common to a group of operators.

Naturally, the format of each emergency identifier is characteristic of the technology of the associated emergency interfaces. Thus, in a given set of broadcasting devices, provision may be made for a plurality of distinct emergency identifiers if the gateway has emergency interfaces using different technologies.

It may be observed that the emergency identifier of the invention should not be confused with the service set identifier (SSID) that is conventionally used by WLAN access points for local usage; it should be recalled in this respect that an SSID is the name of a "WiFi" network using the IEEE 802.11 standard, and it is designed to be "listened-for" by terminals in order to enable them (when they are authorized) to connect to a "WiFi" access point that is broadcasting a particular SSID.

A risk associated with the system of the invention is that of routing loops that might be generated if a faulty gateway seeking to relay traffic calls on a broadcasting device that, at that time, is incapable of acting as a relay (e.g. because the fault affects a network element that terminates the network connections both of the gateway and of the broadcasting device). In order to avoid this risk, provision is preferably made for:
  the gateway to install preventatively a plurality of IP routes that enable the same service provider to be reached successfully; and/or
  each broadcasting device that detects a fault on its main WAN interface to cease broadcasting said emergency identifier temporarily, e.g. for so long as it has not discovered a relay capable of relaying the fault report to the CSC, or that has not installed one or more emergency routes for its own benefit.

The end of the fault may be detected directly by the gateway or it may be notified to the gateway by a CSC or by the network. Preferably, the gateway has means for returning to nominal routing when the fault has been resolved, such that the fault and its resolution are completely transparent to the customer. Switching traffic over to the main connection as re-established in this way may take place immediately or in deferred manner, in application of logic that may be specific to each service and that is known to the gateway. For example, provision may be made that only new telephone calls make use of the main line, whereas ongoing calls continue to use an emergency route.

Finally, there follows a description of the invention being applied to two types of service that are in very widespread use.

Figure 9:
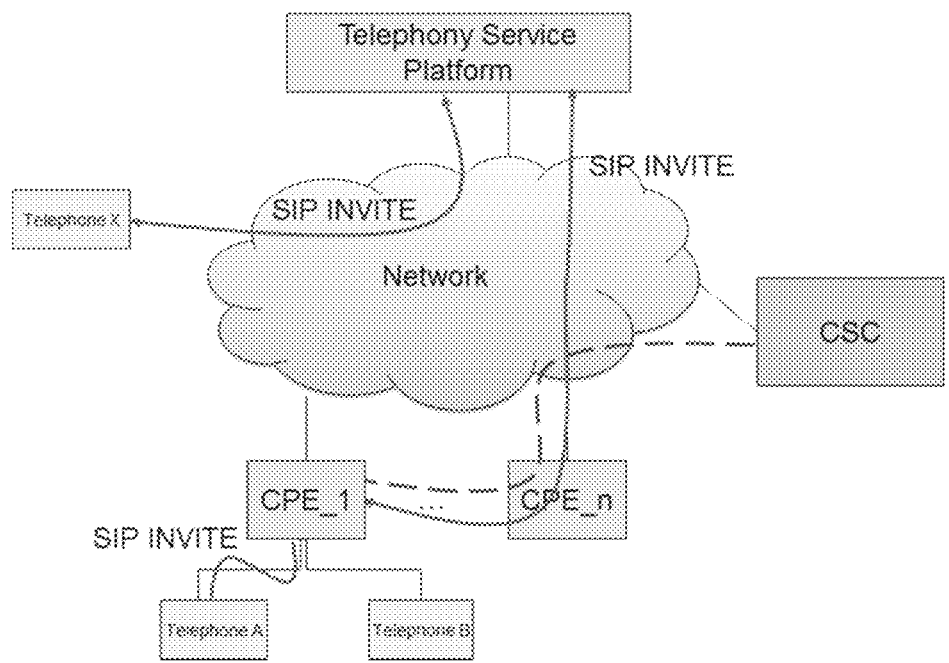
FIG. 9 shows a telephone call being set up via one or more relay gateways between firstly a VoIP telephone connected to a gateway suffering from a fault that affects its nominal VoIP service, and secondly a VoIP telephone connected to the network.

For a customer who has subscribed to a VoIP offer, the gateway has a proxy function, e.g. proxy session initiation protocol (Proxy SIP) for relaying signaling messages (SIP INVITE) sent by a VoIP terminal to a telephone service platform, e.g. a session border controller (SBC) or a proxy call session control function (P-CSCF); it is these signaling messages that govern access to the VoIP service, i.e. that make it possible to register with the service, and then to set up and receive calls. FIG. 9 shows a telephone call being set up via one or more relays gateways between a VoIP telephone "A" connected to a gateway CPE_1, and a VoIP telephone "X" connected to the network. It should be observed that the identifiers of the telephone line, even when calling on a relay gateway, remain the same as those of the faulty telephone line.

For a customer who has subscribed to a television over IP (IPTV) offer, or to a video on demand (VoD) offer, the gateway has a proxy function, e.g. an Internet group management protocol (IGMP) or a multicast listener discovery (MLD) proxy for relaying subscription messages and end-of-subscription messages to an IPTV content broadcast service (in particular broadcasting TV programs) that are sent by the set top box (STB) that is connected to the gateway via the access equipment in charge of handling these subscription/end-of-subscription messages; it is these signaling messages that determine access to the IPTV content desired by the customer, i.e. the TV program to which the customer seeks access. The corresponding traffic is conveyed along distribution trees that are calculated and set up using IP multicast transmission mode. Each termination of the tree is situated in access equipment that connects various customers interested in receiving the content. When a fault occurs in the line connecting the customer to the network, the signaling traffic is redirected to a relay device that contains the corresponding proxy function: this assumes that the faulty gateway has the ability to discover dynamically the functions that are provided by the relay devices that the gateway might call on; conventional protocols such as DHCP or SLP may be used for this purpose. Thus, in order to reduce down time, it is possible to put into place a specific emergency identifier for each service; this specific emergency identifier serves to initialize a network association procedure that is limited to relay devices capable of relaying the traffic of that service.

The proxy function of the relay gateway then takes charge of relaying new subscription or end-of-subscription requests to an IPTV content broadcast service as issued by the IPTV receiver(s) connected to the faulty gateway. These requests are handled by the access equipment to which the relay gateway is connected. Once the subscription request has been processed, traffic characteristics of the requested IPTV content is conveyed by the access equipment to the relay device, which forwards it to the faulty gateway, which finally delivers it to the IPTV receiver.

In this context, the traffic is inevitably broadcast over the local network to which the relay gateway is connected (since the gateway behaves like L2 equipment on the local network), in addition to being conveyed to the faulty gateway. In order to avoid polluting the local network to which the relay gateway is connected with unwanted IPTV broadcast traffic, the relay gateway may use means for analyzing and filtering the traffic going to an IP multicast group address.

The invention may be implemented within nodes, e.g. home or business gateways, or broadcasting devices, communications networks, by means of software and/or hardware components.

The software components may be integrated in a conventional computer program for managing a network node. That is why, as mentioned, the present invention also provides a computer system. The computer system comprises in conventional manner a central processor unit using signals to control a memory, and also an input unit and an output unit. In addition, the computer system may be used to execute a computer program including instructions for performing the service restoration method of the invention.

Specifically, the invention also provides a computer program that is downloadable from a communications network and that includes instructions for executing steps of the service restoration method of the invention when it is executed on a computer. The computer program may be stored on a computer readable medium, and may be executable by a microprocessor.

The program may use any programming language, and be in the form of source code, object code, or code intermediate between source code and object code, such as in a partially compiled form, or in any other desirable form.

The invention also provides a non-removable or a partially or totally removable data medium that is readable by a computer and that includes instructions of a computer program as specified above.

The data medium may be any entity or device capable of storing the program. For example, the medium may comprise storage means such as a read only memory (ROM), e.g. a compact disk (CD) ROM, or a microelectronic circuit ROM, or magnetic recording means, such as a hard disk, or indeed a USB flash drive.

In addition, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute to be used in the execution of the service restoration method of the invention.

Although the present disclosure has been described with reference to one or more examples, workers skilled in the art will recognize that changes may be made in form and detail without departing from the scope of the disclosure and/or the appended claims.

The invention claimed is:

1. A residential gateway comprising:
a processor; and
a non-transitory computer-readable medium comprising instructions stored thereon, which when executed by the processor configure the residential gateway to perform acts comprising:
acting, after a fault is detected, comprising at least one service to which said residential gateway normally gives access not being accessible or the quality of at least one service to which said residential gateway normally gives access being degraded:
to search for at least one emergency IP route to a destination for data associated with said service, said emergency IP route passing:
via an emergency IP interface of said residential gateway, other than a connection between the residential gateway and said residential gateway's nominal network connection equipment; and
via a broadcasting device, which is distinct from the residential gateway and with which the residential gateway is suitable for setting up a network association, said broadcasting device belonging to a set of emergency devices in which emergency identifiers recognizable by said residential gateway are configured, said emergency devices being configured to broadcast the emergency identifiers with which they are configured; and
to select such an emergency IP route in order to supply said service by using said broadcasting device as a relay; and
detecting presence of said broadcasting device by listening for and recognizing at least one of said emergency identifiers broadcast by said broadcasting device.

2. The residential gateway according to claim 1, wherein the instructions further configure the residential gateway to act, after selecting said at least one emergency IP route, to update a routing table including said emergency IP route.

3. The residential gateway according to claim 2, wherein said routing table includes said emergency IP route prior to said detection of a fault.

4. The residential gateway according to claim 1, wherein the instructions further configure the residential gateway to perform acts comprising:
   detecting said fault;
   searching for at least one route capable of connecting the residential gateway to at least one Gateway Supervision Center; and
   using said route to send at least one fault report to the at least one Gateway Supervision Center.

5. The residential gateway according to claim 4, wherein the instructions further configure the residential gateway to send said fault report via an IP interface or via a data link layer.

6. A service restoration system comprising:
   at least one residential gateway, which comprises:
   comprising:
      a processor; and
      a non-transitory computer-readable medium comprising instructions stored thereon, which when executed by the processor configure the residential gateway to perform acts comprising:
         acting, after a fault is detected comprising at least one service to which said residential gateway normally gives access not being accessible or the quality of at least one service to which said residential gateway normally gives access being degraded:
            to search for at least one emergency IP route to a destination for data associated with said service, said emergency IP route passing:
               via an emergency IP interface of said residential gateway, other than a connection between the residential gateway and said residential gateway's nominal network connection equipment; and
               via a broadcasting device, which is distinct from the residential gateway and with which the residential gateway is suitable for setting up a network association, said broadcasting device belonging to a set of emergency devices in which emergency identifiers recognizable by said residential gateway are configured, said emergency devices being configured to broadcast the emergency identifiers with which they are configured; and
            to select such an emergency IP route in order to supply said service by using said broadcasting device as a relay; and
         detecting presence of said broadcasting device by listening for and recognizing at least one of said emergency identifiers broadcast by said broadcasting device; and
         the broadcasting device, which is configured to act as a relay for said residential gateway in order to provide said service, and also to broadcast the emergency identifier recognizable by the residential gateway.

7. The service restoration system according to claim 6 wherein said dedicated emergency identifier is characteristic of a technology of said emergency interface and/or of said service.

8. The service restoration system according to claim 6, wherein said broadcasting device is further configured to temporarily cease to broadcast said emergency identifier when the broadcasting device does not have a functional IP route for providing the at least one service.

9. A service restoration method for restoring service, the method comprising:
   detecting a fault comprising at least one service to which a residential gateway normally gives access no longer being accessible or the quality of at least one service to which the residential gateway normally gives access being degraded;
   said residential gateway searching for at least one emergency IP route to a destination for data associated with said service, said emergency IP route passing:
      via an emergency IP interface of said residential gateway other than a link between the residential gateway and the residential gateway's nominal network connection equipment; and
      via a broadcasting device, which is distinct from the residential gateway and with which the residential gateway is suitable for setting up a network connection, said broadcasting device belonging to a set of emergency devices in which emergency identifiers recognizable by said residential gateway are configured, said emergency devices being configured to broadcast the emergency identifiers with which they are configured; and
   the residential gateway selecting such an emergency IP route to provide said service by using said broadcasting device as a relay;
   the residential gateway detecting presence of said broadcasting device by listening for and recognizing at least one of said emergency identifiers broadcast by said broadcasting device.

10. The service restoration method according to claim 9, wherein following said selection of at least one emergency IP route, the method comprises the residential gateway updating a routing table including said emergency IP route.

11. The service restoration method according to claim 10, wherein said routing table includes said emergency IP route prior to detecting a fault.

12. The service restoration method according to claim 9, wherein said emergency identifier is characteristic of a technology of said emergency interface and/or of said service.

13. The service restoration method according to claim 9, wherein said fault detection is performed by said residential gateway, and the residential gateway then performs the following acts:
   searching for at least one route capable of connecting the residential gateway to at least one Gateway Supervision Center; and
   using said route to send at least one fault report to at least one Gateway Supervision Center.

14. The service restoration method according to claim 13, wherein said residential gateway sends said fault report via an IP interface or via the data link layer.

15. A non-transitory computer-readable medium comprising computer program code instructions stored thereon for executing a service restoration method when the instructions are executed by a processor of a residential gateway, wherein the method comprises:
   detecting a fault comprising at least one service to which the residential gateway normally gives access no longer being accessible or the quality of at least one service to which the residential gateway normally gives access being degraded;
   said residential gateway searching for at least one emergency IP route to a destination for data associated with said service, said emergency IP route passing:
      via an emergency IP interface of said residential gateway other than a link between the residential gateway and the residential gateway's nominal network connection equipment; and via a broadcasting device, with which the residential gateway is suitable for setting up a network connection, said broadcasting device belonging to a set of emergency devices in which emergency identifiers recognizable by said residential gateway are configured, said emergency devices being configured to broadcast the emergency identifiers with which they are configured; and the residential gateway selecting such an emergency IP route to provide said service by using said broadcasting device as a relay;

the residential gateway detecting presence of said broadcasting device by listening for and recognizing at least one of said emergency identifiers broadcast by said broadcasting device.

16. The residential gateway of claim 1, wherein the selected emergency IP route to supply said service is specific to the service, and the emergency identifiers are characteristic of respective services.

17. The residential gateway of claim 1, wherein the acts include acting to dynamically discover the services that are provided by the broadcasting devices based on the emergency identifiers broadcast by the broadcasting devices, said emergency identifiers being specific to respective services.

18. The residential gateway of claim 1, wherein the residential gateway is configured to share traffic between the set of emergency devices or use them in turn for a length of time.

* * * * *